(12) United States Patent
Kakizaki et al.

(10) Patent No.: US 8,530,396 B2
(45) Date of Patent: *Sep. 10, 2013

(54) GREASE COMPOSITION FOR CONSTANT VELOCITY JOINT AND CONSTANT VELOCITY JOINT

(71) Applicants: Kyodo Yushi Co., Ltd., Fujisawa (JP); NTN Corporation, Osaka (JP)

(72) Inventors: Mitsuhiro Kakizaki, Fujisawa (JP); Shinya Kondo, Fujisawa (JP); Shinichi Takabe, Iwata (JP); Takaaki Shibata, Iwata (JP)

(73) Assignees: Kyodo Yushi Co., Ltd., Kanagawa (JP); NTN Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,859

(22) Filed: Nov. 20, 2012

(65) Prior Publication Data

US 2013/0079158 A1    Mar. 28, 2013

Related U.S. Application Data

(63) Continuation of application No. 12/124,916, filed as application No. PCT/JP2006/323289 on Nov. 22, 2006, now Pat. No. 8,377,858.

(30) Foreign Application Priority Data

Nov. 22, 2005 (JP) ................... 2005-337550

(51) Int. Cl.
*C10M 115/08* (2006.01)
*C10M 129/95* (2006.01)
*C10M 169/04* (2006.01)

(52) U.S. Cl.
USPC .......................................... 508/481; 508/182

(58) Field of Classification Search
USPC .................................. 508/181, 183, 481, 528
See application file for complete search history.

(56) References Cited

U.S. PATENT DOCUMENTS 5,207,936 A    5/1993   Anzai et al.
5,512,188 A    4/1996   Kinoshita et al.
(Continued)

FOREIGN PATENT DOCUMENTS

CN    1332784      1/2002
EP    0 768 367    4/1997
(Continued)

OTHER PUBLICATIONS

International Search Report issued for PCT/JP2006/323289, mailed Feb. 6, 2007.

(Continued)

*Primary Examiner* — Pamela H Weiss
(74) *Attorney, Agent, or Firm* — Nixon & Vanderhye P.C.

(57) ABSTRACT

The invention provides a grease composition for constant velocity joint containing the components (a) to (g) below and a constant velocity joint containing said composition. (a) a diurea thickening agent having the following formula (1):

$$R^1NH\text{—}CO\text{—}NH\text{—}C_6H_4\text{-}p\text{-}CH_2\text{—}C_6H_4\text{-}p\text{-}NH\text{—}CO\text{—}NHR^2 \quad (1)$$

wherein $R^1$ and $R^2$ may be the same or different and represent $C_8$-$C_{20}$ alkyl groups, (b) an ester synthetic oil, (c) a mineral oil and/or a synthetic hydrocarbon oil, (d) a molybdenum dialkyldithiocarbamate, (e) molybdenum disulfide, (f) a polytetrafluoroethylene, and (g) a zinc dithiophosphate compound. The grease composition of the invention reduces variations in rotational resistance of the constant velocity joint at a low temperature.

8 Claims, No Drawings

(56) References Cited

U.S. PATENT DOCUMENTS

| | | | |
|---|---|---|---|
| 5,670,461 | A | 9/1997 | Schreiber et al. |
| 5,707,944 | A | 1/1998 | Yokouchi et al. |
| 5,854,183 | A | 12/1998 | Hasegawa et al. |
| 5,952,273 | A | 9/1999 | Suzuki et al. |
| 6,319,880 | B1 | 11/2001 | Okaniwa |
| 6,329,327 | B1 | 12/2001 | Tanaka et al. |
| 6,333,297 | B2 | 12/2001 | Takabe |
| 6,444,621 | B1 | 9/2002 | Okaniwa et al. |
| 6,456,400 | B1 | 9/2002 | Ikegami et al. |
| 6,465,400 | B1 | 10/2002 | Kamimura |
| 8,377,858 | B2 * | 2/2013 | Kakizaki et al. .............. 508/481 |
| 2003/0027728 | A1 | 2/2003 | Kawamura et al. |
| 2004/0058830 | A1 | 3/2004 | Kan et al. |
| 2006/0068996 | A1 | 3/2006 | Kuwabara et al. |
| 2008/0058235 | A1 | 3/2008 | Takigawa et al. |

FOREIGN PATENT DOCUMENTS

| | | |
|---|---|---|
| EP | 768367 A1 * | 4/1997 |
| EP | 1 154 011 | 11/2001 |
| JP | 06-057283 | 3/1994 |
| JP | 10-273692 | 10/1998 |
| JP | 2001-064665 | 3/2001 |
| JP | 2001-240886 | 9/2001 |
| JP | 2003-165988 | 6/2003 |
| JP | 2004-256665 | 9/2004 |
| JP | 2005-226038 | 8/2005 |
| JP | 2005-281457 | 10/2005 |
| WO | 2005/078053 | 8/2005 |

OTHER PUBLICATIONS

Written Opinion of the International Searching Authority issued for PCT/JP2006/323289, mailed Feb. 6, 2007.

* cited by examiner

GREASE COMPOSITION FOR CONSTANT VELOCITY JOINT AND CONSTANT VELOCITY JOINT

This application is a continuation of U.S. Pat. No. 8,377, 858, filed May 21, 2008, and assigned U.S. application Ser. No. 12/124,916, and which is a continuation of International Application No. PCT/JP2006/323289, filed 22 Nov. 2006, which claims priority to Japan Application No. 2005-337550, filed 22 Nov. 2005, the entire contents of each of which are hereby incorporated by reference.

FIELD OF THE INVENTION

This invention relates to a grease composition for a constant velocity joint which can reduce variation in rotational resistance, at a low temperature, of the constant velocity joint and a constant velocity joint containing said grease composition. More specifically, this invention relates to a grease composition for a constant velocity joint which is suitable to reduce variation in rotational resistance, at a low temperature, of a fixed type constant velocity joint or a sliding type constant velocity joint used for automobile driving shafts, and a constant velocity joint containing the same.

BACKGROUND OF THE INVENTION

In the field of automobile industry, FF-car production has recently been increasing for the purpose of reducing weight and expanding living space. 4WD car production is also growing due to their functionality. These FF and 4WD cars realize a power transmission and steering by the front wheels, and therefore, it is necessary to secure a smooth power transmission, even when the steering wheel is fully turned, and the constant velocity joint is inevitable as a part to transmit a rotational movement at a constant velocity in response to the changes in crossing angles between the crossing two axes.

Because performance of cars has recently been improved further and the production of high-power cars is increasing, constant velocity joints are exposed to greater stresses and severer lubrication condition.

Meanwhile, there is a tendency that an improvement of riding comfort in a car is also required at a higher level. The improvement of the riding comfort is demanded in any climate regions, for example, from extreme hot regions to extreme cold regions.

In extreme cold regions, the car may be started at an extreme low temperature. In such a condition, the rotational resistance may vary upon rotating due to the difference in frictional resistances among parts composing the constant velocity joint. Variation in rotational resistance may generate stick-slip sounds which may then lead to deteriorate the riding comfort.

There have been proposed grease compositions for constant velocity joints wherein a mineral oil is used as a base oil and a molybdenum compound is used as an additive (see e.g. Patent Documents 1 and 2). However, these grease compositions for constant velocity joints are incapable of sufficiently reducing variation in rotational resistance when different factors become combined at an extreme low temperature, therefore an improvement for more stable performance is required.

Patent document 1: JP-A-H10-273692

Patent document 2: JP-A-2003-165988

DISCLOSURE OF THE INVENTION

Problem to be Solved by the Invention

An object of the present invention is to provide a grease composition for a constant velocity joint which can reduce variation in rotational resistance, at a low temperature, of the constant velocity joint.

Another object of the invention is to provide a constant velocity joint which contains the aforementioned grease composition for the constant velocity joint.

Means to Solve the Problem

In order to achieve the aforementioned object, the present inventors have extensively studied to achieve the above object and found that the grease composition which contains specific components can reduce variation in rotational resistance, at a low temperature, of the constant velocity joint. Based on this finding, they have completed the present invention.

Accordingly, the invention provides a grease composition for a constant velocity joint shown below and a constant velocity joint which contains the same.

1. A grease composition for a constant velocity joint, said composition comprising the following components (a) to (g):
(a) a diurea thickening agent having the following formula (1):

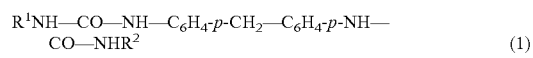
$$R^1NH\text{—}CO\text{—}NH\text{—}C_6H_4\text{-}p\text{-}CH_2\text{—}C_6H_4\text{-}p\text{-}NH\text{—}CO\text{—}NHR^2 \quad (1)$$

wherein $R^1$ and $R^2$ may be the same or different and represent $C_8$-$C_{20}$ alkyl groups,
(b) a synthetic ester oil,
(c) a mineral oil and/or a synthetic hydrocarbon oil,
(d) a molybdenum dialkyldithiocarbamate,
(e) molybdenum disulfide,
(f) a polytetrafluoroethylene, and
(g) a zinc dithiophosphate compound.

2. The grease composition for a constant velocity joint according to the above item 1, wherein the content of the component (a) is 1-20% by mass, the content of the component (b) is 5-40% by mass, the content of the component (c) is 40-80% by mass, the content of component (d) is 0.1-10% by mass, the content of the component (e) is 0.1-10% by mass, the content of the component (f) is 0.1-10% by mass and the content of the component (g) is 0.1-10% by mass based on the total mass of the composition.

3. The grease composition for a constant velocity joint according to the above item 1 or 2, wherein the component (b) is a synthetic ester oil obtained from a polyol having three or more hydroxyl groups and a carboxylic acid.

4. The grease composition for a constant velocity joint according to any one of the above items 1 to 3, wherein a flow point of the synthetic ester oil, the component (b), is not higher than −40° C.

5. The grease composition for a constant velocity joint according to any one of the above items 1 to 4, wherein a kinetic viscosity of the synthetic ester oil, the component (b), is not less than 40 mm²/S at 40° C.

6. The grease composition for a constant velocity joint according to any one of the above items 1 to 5, wherein the torque transmission part of the constant velocity joint is in the shape of a ball.

7. The grease composition for a constant velocity joint according to any one of the above items 1 to 6, wherein said constant velocity joint is a fixed type constant velocity joint.
8. The grease composition for a constant velocity joint according to any one of the above items 1 to 6, wherein said constant velocity joint is a sliding type constant velocity joint.
9. A constant velocity joint which comprises the grease composition for a constant velocity joint according to any one of the above items 1 to 8.

Effects of the Invention

The grease composition of the invention for a constant velocity joint is highly useful for reducing variation in rotational resistance, at a low temperature, of the constant velocity joint, such as a fixed type constant velocity joint and a sliding type constant velocity joint, which are used for the automobile driving shaft. The invention also provides a constant velocity joint which contains the grease composition for a constant velocity joint having such excellent properties.

The application condition of constant velocity joints has been expanding in association with recent economic growth, and as a result, the requirements for the performance thereof have also become diversified, enhancing the importance of smooth working of the constant velocity in extreme cold regions.

However, a grease composition for a constant velocity joint which can reduce variation in rotational resistance of the constant velocity joint sufficiently at a low temperature has not yet become available. Under such a situation, the grease composition of the invention for a constant velocity joint, which can reduce variation in rotational resistance of the constant velocity joint at a low temperature may be considered as an extremely useful invention.

The invention is based on the finding that the grease composition for a constant velocity joint which contains specific components can achieve the aforementioned purposes. For a reason the grease composition of the invention for a constant velocity joint has an excellent activity to reduce variation in rotational resistance at a low temperature, it may be possible that fluidity, viscosity and lubricity, etc. become optimized at a low temperature by using certain urea compounds as a thickening agent and certain synthetic oils as a base oil and by adding specific molybdenum compounds, zinc dithiophosphate compounds and polytetrafluoroethylenes as additives, thereby reducing variation in rotational resistance.

BEST MODES FOR CARRYING OUT THE INVENTION

The invention will be explained in more detail as follows.

The grease composition of the invention for a constant velocity joint is a grease like composition which can be used for a constant velocity joint, wherein the constant velocity joint is a part which transmits a rotational movement at a constant velocity in response to changes in crossing angle between the crossing two axes. Further, the grease means a solid or semi-solid substance prepared by dispersing thickening agents into a base oil.

The grease composition of the invention for a constant velocity joint is characterized by comprising the components (a) to (g) as essential components. Each component will be explained in more detail below.

Firstly, the diurea thickening agent, the component (a) of the invention has the following formula (1):

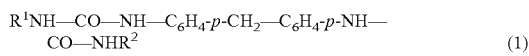
$$R^1NH\text{—}CO\text{—}NH\text{—}C_6H_4\text{-}p\text{-}CH_2\text{—}C_6H_4\text{-}p\text{-}NH\text{—}CO\text{—}NHR^2 \quad (1)$$

wherein $R^1$ and $R^2$ may be same or different and represent $C_8$-$C_{20}$ alkyl groups.

The diurea thickening agent, component (a), can be obtained, for example, by reacting certain diisocyanates with certain monoamines. The isocyanate is more specifically, diphenylmethane-4, 4'-diisocyanate.

Monoamines include aliphatic amines, aromatic amines, alicyclic amines or mixture thereof. Specific examples of the aliphatic amines include octylamine, dodecylamine, hexadecylamine, octadecylamine and oleylamine. Specific examples of the aromatic amines include aniline and p-toluidine. Specific examples of the alicyclic amines include cyclohexylamine. Among the aforementioned monoamines, diurea thickening agents, which can be prepared with octylamine, dodecylamine, hexadecylamine, octadeclyamine or a mixture thereof, are preferred.

The content of the diurea thickening agent, component (a), based on the total mass of the composition depends on the types of the agents. The consistency (worked penetration) of the grease of the invention is preferably within a range of 250-350, and accordingly, the content of the diurea thickening agent, component (a), is preferably in an amount required to display such consistency. The content of the diurea thickening agent, component (a), can be, for example, 1-20% by mass, preferably 2-20% by mass based on the total mass of the composition but not limited to these.

The synthetic ester oil, component (b) of the invention is represented by trimellitic acid esters and polyol esters, but most preferably synthetic ester oil which can be obtained from polyols having three or more hydroxyl groups and carbonic acids, and has a flow point of not higher than –40° C. and a kinetic viscosity of not less than 40 mm$^2$/S at 40° C. The content of the synthetic ester oil, component (b), can be for example, 5-40% by mass, preferably 10-40% by mass, based on the total mass of the composition, but not limited to these.

A mineral oil and/or a synthetic hydrocarbon oil, component (c) of the invention can be used as a base oil, either alone or in combination. The content of the mineral oil and/or synthetic hydrocarbon oil, component (c), can be the balance, i.e. the balancing amount against all added components including an optional component(s), based on the total mass of the composition.

Preferably, a molybdenum dialkyldithiocarbamate, component (d) of the invention has the formula (2) below.

$$(R^3R^4N\text{—}CS\text{—}S)_2\text{—}Mo_2O_mS_n \quad (2)$$

wherein $R^3$ and $R^4$ independently represent, for example, $C_1$-$C_{24}$ alkyl groups, preferably $C_2$-$C_{18}$ alkyl groups, m is 0-3, n is 1-4 and m+n=4. The content of the molybdenum dialkyldithiocarbamate, the component (d), is preferably 0.1-10% by mass, more preferably 0.5-5% by mass, based on the total mass of the composition.

Molybdenum disulfide, the component (e) of the invention is widely used as a solid lubricant for constant velocity joints. As for the mechanism of lubrication, molybdenum disulfide is known to have a layer-lattice structure which can easily be sheared into thin layer structures by sliding, thereby reducing friction resistance. It also displays an effect to prevent seizing of constant velocity joints.

The content of molybdenum disulfide, the component (e), is preferably 0.1-10% by mass, more preferably 0.5-5% by mass, based on the total mass of the composition. The amount to be added is preferably in the range where the vibration properties or the friction coefficients of constant velocity joints are not adversely affected.

A polytetrafluoroethylene, the component (f) of the invention, is one generally used in the fields of rubber, paint, ink and lubricant other than grease and have the molecular weight between several thousands and several hundred thousands. Because the cohesive energy of polytetrafluoroethylene is lower than those of other polymeric compounds, and the critical surface tension is extremely small, it is considered that a shear stress due to sliding makes the polytetrafluoroethylene particles present in sliding area into tiny flakes which easily spread on the object materials, thereby providing excellent lubrication properties. The content of the polytetrafluoroethylene, the component (f), is preferably 0.1-10% by mass, more preferably 0.5-5% by mass, based on the total mass of the composition.

A zinc dithiophosphate compound, the component (g) of the invention is a zinc dialkyldithiophosphate, a zinc diaryldithiophosphate and the like. The content of the zinc dithiophosphate compound, the component (g), is preferably 0.1-10% by mass, more preferably 0.5-5% by mass, based on the total mass of the composition.

In addition to the above components, the grease composition of the invention may contain other additives such as extreme-pressure additives, anti-oxidants, rust preventing agents, anti-corrosive agents and the like, which are conventionally used for the grease composition.

The constant velocity joint of the invention, wherein the torque transmission part of the constant velocity joint is sphere, includes a fixed type constant velocity joint such as Rzeppa and Birfield types or a sliding type conventional velocity joint such as double offset or cross group types. They utilize balls as torque transmission parts, which are placed on the tracks formed on the outer and inner races, and have a structure to be incorporated through the cage.

A constant velocity joint wherein the constant velocity joint of the invention is a fixed type constant velocity joint includes the aforementioned fixed type constant velocity joint such as Rzeppa and Birfield types, and can form a large operation angle not less than 45°.

A constant velocity joint wherein the constant velocity joint of the invention is a sliding type constant velocity joint includes the aforementioned sliding type constant velocity joint such as double offset or cross group types, and cannot take form an operation angle as large as in the case of the fixed type constant velocity joint, but can slide in the direction of the axis.

The invention will now be described with reference to examples. It should be noted, however, that the examples do not intend to limit the scope of the invention. It should also be noted that reasonable variations can be made within the spirit of the invention, however, such variations are still included within the scope of the invention.

EXAMPLES 1-4, COMPARATIVE EXAMPLES 1-4

Preparation of Grease Composition

In 3,700 g of the mineral oil (c) (kinetic viscosity of 11 mm$^2$/s at 100° C.), 250 g (1 mole) of diphenylmethane-4,4'-diisocyanate, 129 g (1 mole) of octylamine and 270 g (1 mole) of octadecylamine were reacted, and the resulting diurea compound (a) was dispersed evenly to obtain a base grease. Base oils and additives were added to the above base grease to prepare the composition as shown in Table 1 or 2. The resulting composition was kneaded with a triple rolling mill and the worked penetration was adjusted to 300 according to JIS 2220.

The composition of the tested products and the results of the variations in the rotational torque at −40° C. are shown in Table 1 for Examples and in Table 2 for Comparative Examples.

TABLE 1

| | | Mass % Examples | | | |
|---|---|---|---|---|---|
| | | 1 | 2 | 3 | 4 |
| Thickening agent | (a) Diurea compound | 8.0 | | | |
| Base oil (mixing ratio %) | (b) Synthetic ester oil *[1] | 17.0 (20) | 8.5 (10) | 17.2 (20) | 34.0 (40) |
| | (c)-1 Mineral oil | 51.0 (60) | 51.0 (60) | 51.6 (60) | 51.0 (60) |
| | (c)-2 Synthetic hydrocarbon oil *[2] | 17.0 (20) | 25.5 (30) | 17.2 (20) | |
| Additives | (d) Molybdenum dialkyldithiocarbamate *[3] | 2.0 | 2.0 | 2.0 | 2.0 |
| | (e) Molybdenum disulfide *[4] | 3.0 | 3.0 | 1.0 | 3.0 |
| | (f) Polytetrafluoroethylene *[5] | 1.0 | 1.0 | 2.0 | 1.0 |
| | (g) Zinc dithiophosphate compound *[6] | 1.0 | 1.0 | 1.0 | 1.0 |
| Worked penetration | | 300 | | | |
| Evaluation of variation in rotating torque at −40° C. | | ○ | ○ | ○ | ○ |

TABLE 2

| | | Mass % Comparative Examples | | | |
|---|---|---|---|---|---|
| | | 1 | 2 | 3 | 4 |
| Thickening agent | (a) Diurea compound | 8.0 | | | |
| Base oil (mixing ratio %) | (b) Synthetic ester oil *[1] | — | 17.4 (20) | 17.2 (20) | 17.2 (20) |
| | (c)-1 Mineral oil | 51.0 (60) | 52.2 (60) | 51.6 (60) | 51.6 (60) |
| | (c)-2 Synthetic hydrocarbon oil *[2] | 34.0 (40) | 17.4 (20) | 17.2 (20) | 17.2 (20) |
| Additives | (d) Molybdenum dialkyldithiocarbamate *[3] | 2.0 | — | 2.0 | 2.0 |
| | (e) Molybdenum disulfide *[4] | 3.0 | 3.0 | 3.0 | 3.0 |
| | (f) Polytetrafluoroethylene *[5] | 1.0 | 1.0 | — | 1.0 |
| | (g) Zinc dithiophosphate compound *[6] | 1.0 | 1.0 | 1.0 | — |
| Worked penetration | | 300 | | | |
| Evaluation of variation in rotating torque at −40° C. | | x | x | x | x |

*[1] Ester oil: Trimellitic acid-trialkyl ester having a flow point of −50° C. and a kinetic viscosity of 53 mm$^2$/s at 40° C.
*[2] Synthetic hydrocarbon oil: Polyalphaolefin oil having a kinetic viscosity of 420 mm$^2$/s at 40° C.
*[3] Molybdenum dialkyldithiocarbamate: $(R^3R^4N-CS-S)_2-Mo_2O_mS_n$ wherein $R^3$ and $R^4$ represent $C_1-C_4$ alkyl groups, m is 0-3, n is 1-4 and m + n = 4.
*[4] Molybdenum disulfide (average particle size, 0.45 μm)
*[5] Polytetrafluoroethylene (average particle size, 0.2 μm)
*[6] Zinc dithiophosphate compound: Zinc dialkyldithiophosphate Test for Variation in Rotational Torque A constant velocity joint was left alone under an atmospheric condition at −40° C., and variation range of the torque at the output axis was measured when starting to rotate with θ=40 deg. Evaluation was conducted using a fixed type constant velocity joint in the present test. The variation range at the output axis was assessed according to the following criterion for average torque.

○: cleared (less than 20% variation range)

x: failed (not less than 20% variation range)

Results

The grease compositions for a constant velocity joint according to the present invention in Examples 1-4 show excellent potentials in reducing variations in rotational resistance at a low temperature in comparison to those in comparative examples 1-4 which do not contain component (b), (d), (f) or (g).

What is claimed is:

1. A grease composition for a constant velocity joint, said composition comprising a base oil, a thickening agent and additives, wherein:

said thickening agent consists of (a) a diurea thickening agent which is a reaction product of diphenylmethane-4,4'-diisocyanate with octylamine and octadecylamine, said base oil consists of (b) a trimellitic acid-trialkyl ester oil and, (c) a mineral oil and/or a polyalphaolefin oil, and said additives comprise the following components (d) to (g):

(d) a molybdenum dialkyldithiocarbamate of the following formula:

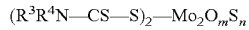

$(R^3R^4N-CS-S)_2-Mo_2O_mS_n$ wherein $R^3$ and $R^4$ represent $C_1$-$C_4$ alkyl groups, m is 0-3, n is 1-4 and m+n=4, (e) molybdenum disulfide, (f) a polytetrafluoroethylene, and (g) a zinc dithiophosphate compound, wherein a flow point of the component (b) is not higher than −40° C., wherein a kinetic viscosity of the component (b) is not less than 40 mm$^2$/S at 40° C., wherein the content of the component (a) is 2-20% by mass and is sufficient to make worked penetration of the grease composition within a range of 250-350, the content of the component (b) is 8.5-34% by mass, the content of the component (c) is 40-80% by mass, the content of component (d) is 0.5-5% by mass, the content of the component (e) is 0.5-5% by mass, the content of the component (f) is 0.5-5% by mass and the content of the component (g) is 0.5-5% by mass based on the total mass of the composition, wherein the base oil consists of 10 to 40% by mass of the component (b) and 90 to 60% by mass of the component (c) based on the total mass of the base oil.

2. The grease composition for a constant velocity joint according to claim 1, wherein the torque transmission part of the constant velocity joint is in the shape of a ball.

3. The grease composition for a constant velocity joint according to claim 1, wherein said constant velocity joint is a fixed type constant velocity joint.

4. The grease composition for a constant velocity joint according to claim 1, wherein said constant velocity joint is a sliding type constant velocity joint.

5. A constant velocity joint which comprises the grease composition for a constant velocity joint according to claim 1.

6. The constant velocity joint according to claim 5, wherein the torque transmission part of the constant velocity joint is in the shape of a ball.

7. The constant velocity joint according to claim 5, wherein said constant velocity joint is a fixed type constant velocity joint.

8. The constant velocity joint according to claim 5, wherein said constant velocity joint is a sliding type constant velocity joint.

* * * * *